United States Patent [19]
Goloff

[11] 3,966,368
[45] June 29, 1976

[54] INSULATED SEAL FOR ENGINES

[75] Inventor: Alexander Goloff, East Peoria, Ill.

[73] Assignee: Caterpillar Tractor Co., Peoria, Ill.

[22] Filed: Jan. 15, 1975

[21] Appl. No.: 541,183

[52] U.S. Cl.................................. 418/83; 418/123; 418/178; 277/195; 277/198
[51] Int. Cl.²................... F01C 21/06; F01C 19/04; F16J 9/12
[58] Field of Search...................... 418/83, 113–124, 418/178; 277/22, 26, 192, 193, 195, 198, 235 A

[56] References Cited
UNITED STATES PATENTS

| | | | |
|---|---|---|---|
| 899,985 | 9/1908 | Huhn | 277/192 |
| 3,672,798 | 6/1972 | Scherenberg | 418/113 |
| 3,853,438 | 12/1974 | Sato | 418/123 |

FOREIGN PATENTS OR APPLICATIONS

| | | | |
|---|---|---|---|
| 1,808,627 | 6/1970 | Germany | 418/113 |

Primary Examiner—John J. Vrablik
Attorney, Agent, or Firm—Wegner, Stellman, McCord, Wiles & Wood

[57] ABSTRACT

An internal combustion engine including improved seals with longer wearing capability. The engine includes a housing having an interior wall defining a combustion chamber and a member movable within the housing, the member being subjected to hot gases of combustion. A sealing device is mounted on the member for movement therewith and establishes a seal between the member and the interior wall. The improved seal embodies at least one insulating member carried by the seal and in relation to resist heat transfer of heat from hot gases of combustion to the seal so that the seal will run at a cooler operating temperature to reduce wear. The invention may be employed in either reciprocating engines or rotary engines.

7 Claims, 3 Drawing Figures

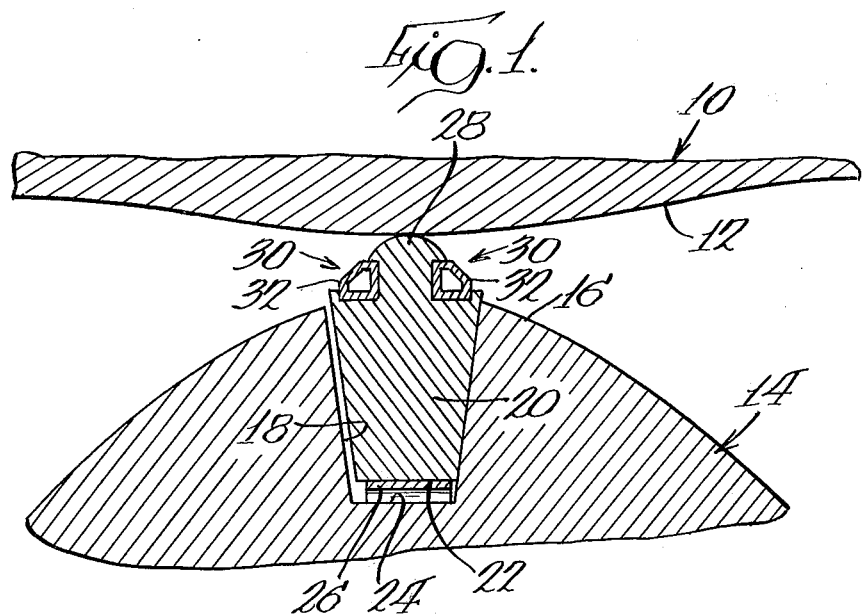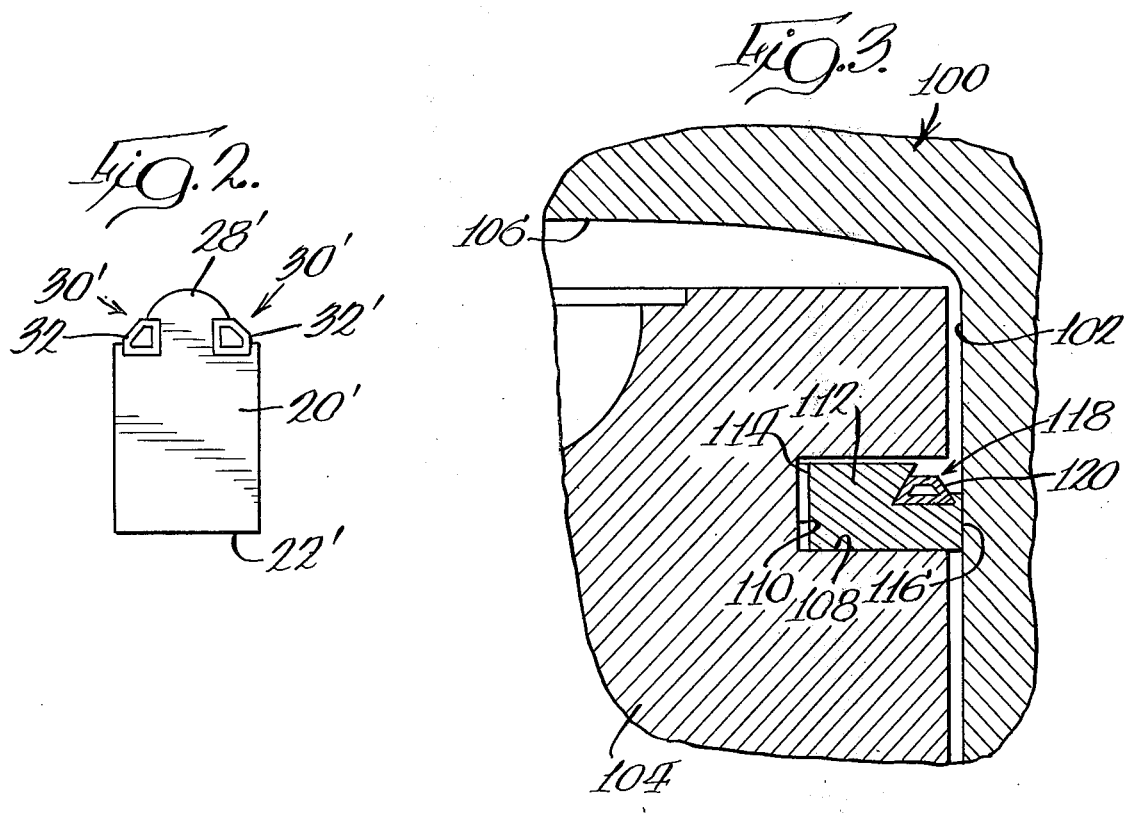

INSULATED SEAL FOR ENGINES

BACKGROUND OF THE INVENTION

This invention relates to internal combustion engines and, more particularly, to improved seals for use in internal combustion engines.

Prior art of possible relevance includes British Pat. No. 1,329,371.

High operating temperatures are a principal cause of wear in sealing elements in internal combustion engines whether of the rotary or the reciprocating type. When engine components are subjected to high temperatures due to the hot gases of combustion, lubricating oil films tend to thin due to decreased viscosity. When such oil films thin, the rate of wear increases.

High temperatures at the interface between seals, pistons, or rotors, and combustion chamber walls are due to friction between the seal and the combustion chamber wall and exposure to the hot gases of combustion. Consequently, a thicker oil film may be maintained by eliminating or minimizing the effect of any of the foregoing factors. In particular, if the seal can be made to run at a cooler temperature, the application of heat to the oil film through contact with the seal will be decreased, thereby enabling the maintenance of a thicker oil film to decrease wear.

SUMMARY OF THE INVENTION

It is the principal object of the invention to provide a new and improved rotary engine including improved seals to reduce wear. More specifically, it is an object of the invention to provide a cooler running seal in an internal combustion engine.

An exemplary embodiment of the invention achieves the foregoing object in an internal combustion engine including a housing having an interior wall defining a combustion chamber and a member movable within the housing and subjected to hot gases of combustion. A sealing device is mounted on the member for movement therewith and establishes a seal between the member and the interior wall. According to the invention, at least one insulating member is carried by the seal in a position to be in heat transfer resisting relation to the combustion chamber to resist heat transfer from the hot gases of combustion to the seal. Consequently, the seal may run at a cooler operating temperature to reduce wear by reason of the fact that heat input to the seal is impeded while heat already in the seal may be conducted away therefrom in the usual manner through the member and/or through the interior wall of the combustion chamber engaged by the seal.

In a highly preferred embodiment, the member is spaced from the interior wall and includes a seal receiving groove. The seal is received in the groove and has a portion extending out of the groove to engage the interior wall. The insulating member is located on the portion of the seal nearest to the opening of the groove.

According to one embodiment of the invention, the insulating member is hollow so as to define a trapped gas space to provide excellent insulating qualities.

The invention is adaptable to either reciprocal engines or rotary engines. In the former case, the member is a reciprocal piston and the interior wall is a cylinder, while the seal and insulating members are rings. In the case of the latter, the member is a rotor having plural apices and there is one of the grooves at each apex and one of the seals in each of the grooves. Moreover, according to this embodiment, each portion of each seal adjacent the opening of the associated groove is provided with the insulating members on each side thereof.

In a highly preferred embodiment of the invention, the groove in the piston or rotor for receiving the seal includes a bottom wall, and the seal has a surface confronting the grooved wall. The opposite surface of the seal is provided with at least one gas unloading groove, and the insulating member is disposed in such groove. As a result, increased wear due to undesirable gas loading is avoided while simultaneously avoiding high temperature operation causing high wear rates.

Other objects and advantages will become apparent from the following specification taken in conjunction with the accompanying drawings.

DESCRIPTION OF THE DRAWINGS

FIG. 1 is a fragmentary, somewhat schematic, sectional view of a rotary engine embodying the invention;

FIG. 2 is a side elevation of a rotary engine seal embodying the invention; and

FIG. 3 is a somewhat schematic, fragmentary sectional view of a reciprocating engine embodying the invention.

DESCRIPTION OF THE PREFERRED EMBODIMENTS

One embodiment of an internal combustion engine embodying the invention is illustrated in FIG. 1. The engine shown in FIG. 1 is a rotary engine, which may be of the so-called "Wankel" type and includes a housing, generally designated 10, having an interior wall 12 which, in connection with side walls (not shown), define the usual chambers including a combustion chamber.

Within the housing 10, a rotor, generally designated 14, is located and the same is connected to a shaft (not shown) in a conventional fashion. The rotor 14 includes a plurality of apices 16 (only one of which is shown) and each apex is provided with a groove 18 opening outwardly toward the interior wall 12.

Within each of the grooves 18 is a seal 20. The seal 20 has a first surface 22 facing the bottom surface 24 of the groove 18. A biasing spring 26 may be disposed between the two. A second end or surface 28 of the seal 20 is opposite the surface 22 and is in sealing engagement with the interior wall 12. As can be seen, a portion of the seal 20 adjacent the under surface 28 extends outwardly of the groove 18 and, accordingly, is in a position to be directly exposed to hot gases of combustion. Consequently, that portion of the seal will run at a relatively high temperature which is not conducive to the maintenance of a thick oil film at the interface between the seal 20 and the wall 12. The problem is exaggerated when provision is made for minimizing undesirable gas loading of the seal 20.

As is well known, the hot gases of combustion will move along the sides of the seal to operate against the surface 22 to drive the seal 20 into firmer engagement with the wall 12. This type of gas loading of the seal 20 can cause increased wear. Accordingly, many seals, such as that employed in the previously identified British Pat. No. 1,329,371 are provided with notches, generally designated 30, on opposite sides of the end 28 to thereby provide surfaces against which the hot gases may act in bucking relation to their action against the surface 22. Consequently, some of the gas loading generated against the bottom of the seal 22 is cancelled. However, through the provision of such notches, an increased surface area is presented to the hot gases of combustion with the consequence that even more heat will be transferred to the seal 20 to thereby make it even more difficult to maintain the desirable oil film thickness.

As seen in FIG. 1, this problem is minimized through the use of tubular insulating members 32 located in the notches 30. The members 32 need not be tubular although a tubular construction is preferred for the reason that seal mass is reduced thereby minimizing wear due to centrifugal force applied to the seal 20 during operation of the motor. In addition, the interior of each member 32 may act as a trapped gas space to enhance the insulating properties.

The insulating members 32 may be formed of any suitable material. For example, porous metal or ceramic materials may be employed.

As a result of the foregoing construction, heat transfer to the end 28 from hot gases of combustion is retarded by reason of the presence of the insulating members 32. At the same time, there is no impediment to heat transfer from the seal 20 to the housing 10 or the rotor 14. Consequently, the seal 20 will operate at a lower temperature so that a desirable oil film thickness may be maintained. Moreover, the gas unloading feature provided by the notches 30 is retained in accordance with the invention.

FIG. 2 shows another form of seal for a rotary engine made according to the invention. The construction illustrated in FIG. 1 is somewhat preferred to that illustrated in FIG. 2 by reason of the Keystone configuration resulting in a lesser liklihood of sticking.

For simplicity, in the embodiment illustrated in FIG. 2, components of the seal corresponding to those shown in FIG. 1 are given like, but primed, reference numbers.

FIG. 3 illustrates the application of the invention to a reciprocating engine. As illustrated, a diesel engine is employed but it is to be understood that the invention is applicable to other reciprocating engines having lower compression ratios than a typical diesel.

The engine illustrated in FIG. 3 includes a housing, generally designated 100, having an interior, cylindrical wall 102. A piston 104 is located within the cylinder for reciprocation therein in the usual fashion. The cylinder wall 102 together with a wall 106 forming part of the head of the engine define a combustion chamber.

The piston 104 is provided with an annular groove 108 opening outwardly towards the cylinder wall 102 and having a bottom surface 110. Within the groove 108 is a piston ring 112 having a first surface 114 facing the groove surface 110. The ring 112 also has a second surface 116 which is opposite to the surface 114 and which is in sealing engagement with the cylinder wall 102.

An upper side of the ring 112 is provided with a notch, generally designated 118, for receipt of a ring-like insulating member 120 which also is preferably of tubular construction. The insulating member 120 may be formed of the same materials as the insulating member 32.

As a result of the foregoing construction, it will be appreciated that that portion of the ring 112 extending from the groove 108 has its contact with hot gases of combustion minimized by reason of the presence of the insulating member 120 so as to run at a cooler temperature allowing maintenance of an optimal oil film. At the same time, it will be recognized that the preferred construction including the notch 118 allows cancellation of undesirable gas loading against the surface 114 of the ring 112.

In the embodiment illustrated in FIG. 3, the insulating member 120 is employed on only one side of the seal defined by the ring 112 for the reason that, in a reciprocating engine, only one side of the ring is ever exposed to the hot gases of combustion.

What is claimed is:

1. In an internal combustion engine including a housing having an interior wall defining a combustion chamber, a member movable within said housing and subjected to hot gases of combustion and a seal mounted on said member for movement therewith and having a surface in engagement with said interior wall to establish a seal between said member and said interior wall, the improvement comprising, at least one insulating member carried by said seal spaced from but adjacent said surface and in heat transfer resisting relation to said combustion chamber to resist heat transfer from said hot gases of combustion to said seal and said surface thereof whereby said seal may run at a cooler operating temperature to reduce wear.

2. The internal combustion engine of claim 1 wherein said movable member is spaced from said interior wall and includes a seal receiving groove, said seal being received in said groove and having said surface extending out of said groove to engage said interior wall, said insulating member being located adjacent the opening of said groove.

3. The internal combustion engine of claim 2 wherein said movable member is a reciprocal piston, said interior wall is cylindrical and said seal and insulating member are rings.

4. The internal combustion engine of claim 2 wherein said movable member is rotor having plural apices, there being one of said grooves at each said apex, and there being one of said seals in each of said grooves, each said seal surface being provided with one of said insulating members on each side thereof.

5. The internal combustion engine of claim 2 wherein said insulating member has a hollow center.

6. The internal combustion engine of claim 2 wherein said groove includes a bottom wall and said seal has a further surface facing said bottom wall, said insulating member being received in a notch in the seal oppositely from said further seal surface, said notch and said insulating member providing a pressure sensitive surface in bucking relation to further said seal surface to minimize undesirable gas loading of said seal.

7. In an internal combustion engine, the combination comprising: a housing having an interior wall defining a combustion chamber; a member movable within said housing and subjected to hot gases of combustion, said member including a seal receiving groove having a bottom surface and opening outwardly toward said wall; a sealing member received in said groove and having a first surface facing said bottom surface and a second, opposed surface in sealing engagement with said wall; a gas unloading groove formed in said sealing member adjacent to be spaced from said second surface; and insulating means on said gas unloading groove for minimizing heat transfer from hot gases of combustion to said sealing member while allowing gas unloading of said sealing member by the pressure of said gases against said gas unloading groove and said insulating means.

* * * * *